United States Patent
Xu et al.

(10) Patent No.: US 10,931,708 B2
(45) Date of Patent: *Feb. 23, 2021

(54) SECURE RANGING WIRELESS COMMUNICATION

(71) Applicant: Apple Inc., Cupertino, CA (US)

(72) Inventors: Mingguang Xu, San Jose, CA (US); Mithat C. Dogan, San Jose, CA (US); Yakun Sun, San Jose, CA (US); Rohit U. Nabar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,441

(22) Filed: Sep. 3, 2019

(65) Prior Publication Data

US 2019/0387019 A1 Dec. 19, 2019

Related U.S. Application Data

(63) Continuation of application No. 15/665,522, filed on Aug. 1, 2017, now Pat. No. 10,447,725.

(60) Provisional application No. 62/449,660, filed on Jan. 24, 2017.

(51) Int. Cl.
*G06F 21/00* (2013.01)
*H04L 29/06* (2006.01)
*H04L 25/02* (2006.01)
*H04B 17/27* (2015.01)

(52) U.S. Cl.
CPC ......... *H04L 63/1441* (2013.01); *H04B 17/27* (2015.01); *H04L 25/0202* (2013.01)

(58) Field of Classification Search
CPC ........ G06F 21/14; G06F 7/582; G06F 21/606; G06F 2207/7219; G06F 21/72; G06F 12/1408; G06F 2211/008
See application file for complete search history.

(56) References Cited

U.S. PATENT DOCUMENTS

| | | |
|---|---|---|
| 2007/0036353 A1 | 2/2007 | Reznik et al. |
| 2009/0239550 A1 | 9/2009 | Myers |
| 2012/0134494 A1 | 5/2012 | Liu |
| 2013/0232565 A1 | 9/2013 | O'Connor |

FOREIGN PATENT DOCUMENTS

WO  WO2017063716 A1  4/2017

*Primary Examiner* — Ghazal B Shehni
(74) *Attorney, Agent, or Firm* — Kowert, Hood, Munyon, Rankin & Goetzel, P.C.

(57) ABSTRACT

This disclosure relates to techniques for performing secure ranging wireless communication. A first wireless device may receive a ranging packet from a second wireless device in a wireless manner. The ranging packet may include a first random sequence portion and a second random sequence portion. The first wireless device may perform one or more channel and noise estimations for the ranging packet. The first wireless device may perform one or more security checks for the ranging packet based on any or all of the first random sequence portion, the second random sequence portion, or the channel and noise estimation(s).

20 Claims, 10 Drawing Sheets

SECURE RANGING WIRELESS COMMUNICATION

PRIORITY INFORMATION

This application is continuation of U.S. application Ser. No. 15/665,522, entitled "Secure Ranging Wireless Communication" and filed Aug. 1, 2017, which claims priority to U.S. provisional patent application Ser. No. 62/449,660, entitled "Secure Ranging Wireless Communication," filed Jan. 24, 2017, which are both hereby incorporated by reference in their entirety as though fully and completely set forth herein.

TECHNICAL FIELD

The present application relates to wireless communication, including to techniques for performing secure ranging wireless communication.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

One use case for wireless communication includes ranging communication. Ranging can provide a wireless key type functionality, among various possible functions. Accordingly, security can be an important consideration, e.g., in order to protect ranging communications from adversarial attack and eavesdropping. Accordingly, improvements in the field are desired.

SUMMARY

Embodiments are presented herein of, inter alia, systems, apparatuses, and methods for performing secure ranging wireless communication.

According to the techniques described herein, secure ranging wireless communication can be performed in a manner that can help protect against various types of attacks, potentially including any or all of eavesdropping, software impersonation, and/or hardware impersonation, at least according to some embodiments.

In some instances, wireless devices may exchange multiple packets as part of a secure ranging frame exchange. As part of the frame exchange, each wireless device may provide the other with at least one packet that includes two random sequence fields, which may be generated based on nonces associated with the wireless devices. The multiple random sequence fields may enable each wireless device to perform any or all of a number of possible security checks to help determine whether a packet is secure (e.g., has not been tampered with) or insecure.

For example, in some instances, a wireless device may perform channel estimation based each of the random sequence fields received in a ranging packet, and perform a consistency check between the channel estimations. Alternatively or in addition, a wireless device may perform channel estimation based on random sequence fields received in different ranging packets, and perform a consistency check between those channel estimations.

As another possibility, a cost function (e.g., a likelihood function) of receiving the second random sequence field (e.g., based on the channel as estimated based on the first random sequence field) may be used as an indicator of whether a packet is secure. For example, such a confidence level test may be considered successful if the value of the cost function does not exceed a certain threshold.

As still another possibility, a hypothesis test may be used, e.g., to check whether the first arrival path of the first random sequence field is fake. In this case, a cost/likelihood function of receiving the second random sequence field may be calculated based on a channel estimation that uses the first random sequence field as received and based on a channel estimation that uses the first random sequence field with the contribution from the first arrival path removed. The difference between the resulting values, or alternatively the ratio between the resulting values, may be compared with a desired threshold, to help determine if the packet may be insecure.

In some instances, a verification check on channel reciprocity between the wireless devices may also or alternatively be used. For example, the wireless devices may share their channel estimates with each other, and each may compare its own channel estimate with the channel estimate of the other wireless device. If the channel estimations do not sufficiently match, this may be an indication that the ranging communication may have been tampered with.

Such techniques may improve the ability of wireless devices to detect attempts to tamper with their ranging communications, at least according to some embodiments. This may in turn improve the security of those ranging communications, as any attempted communications that are determined not to be sufficiently secure can be rejected, potentially preventing a high percentage of attempted attacks from being successful. At least in some instances, the techniques described herein may further accomplish this with a relatively low false alarm/false positive rate.

The techniques described herein may be implemented in and/or used with a number of different types of devices, including but not limited to cellular phones, tablet computers, accessory and/or wearable computing devices, portable media players, vehicles, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
FIG. 1 illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—Wireless Communication System

FIG. 1 illustrates an exemplary (and simplified) wireless communication system 100 in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device 104. The first wireless device 102 and the second wireless device 104 may communicate wirelessly using any of a variety of wireless communication techniques, potentially including secure ranging wireless communication techniques.

As one possibility, the first wireless device 102 and the second wireless device 104 may perform secure ranging using wireless local area networking (WLAN) communication technology (e.g., IEEE 802.11/Wi-Fi based communication) and/or techniques based on WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102, 104 may be any of a variety of types of wireless device. As one possibility, one or more of the wireless devices 102, 104 may be a substantially portable wireless user equipment (UE) device, such as a smart phone, handheld device, a wearable device, a tablet, a motor vehicle, or virtually any type of wireless device. As another possibility, one or more of the wireless devices 102, 104 may be a substantially stationary device, such as a set top box, media player (e.g., an audio or audiovisual device), gaming console, desktop computer, appliance, door, or any of a variety of other types of device.

Each of the wireless devices 102, 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102, 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using either of LTE or CDMA2000 1×RTT, and separate radios for communicating using each of Wi-Fi and Bluetooth. Other configurations are also possible.

As previously noted, aspects of this disclosure may be implemented in conjunction with the wireless communication system of FIG. 1. For example, the wireless devices 102, 104 may communicate using one or more secure ranging wireless communication techniques or features described subsequently herein with respect to FIGS. 4-14. By utilizing such techniques (and/or other techniques described herein), the wireless device(s) may (at least according to some embodiments) be able to achieve highly secure ranging communication.

Figure 2:
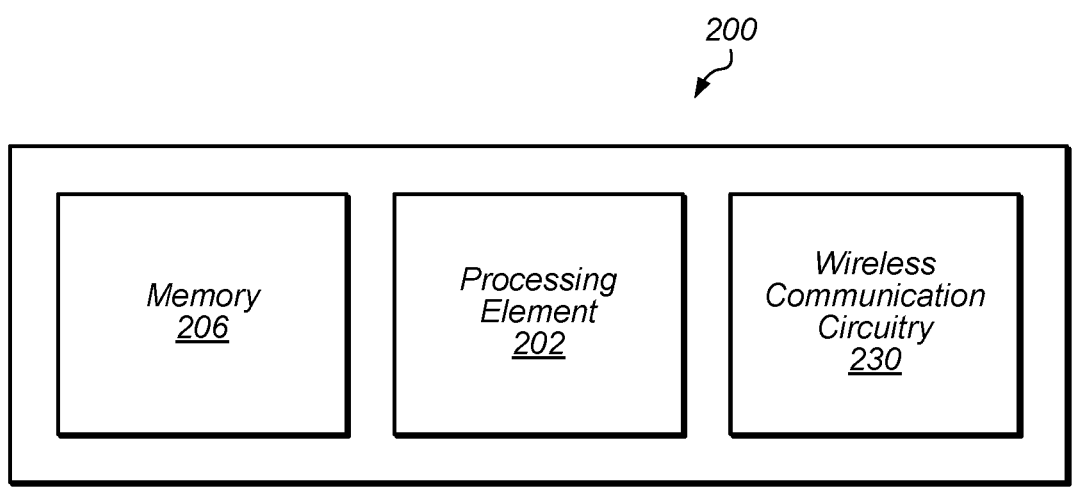
FIGS. 2-3 are block diagrams illustrating example wireless devices, according to some embodiments.
Figure 3:
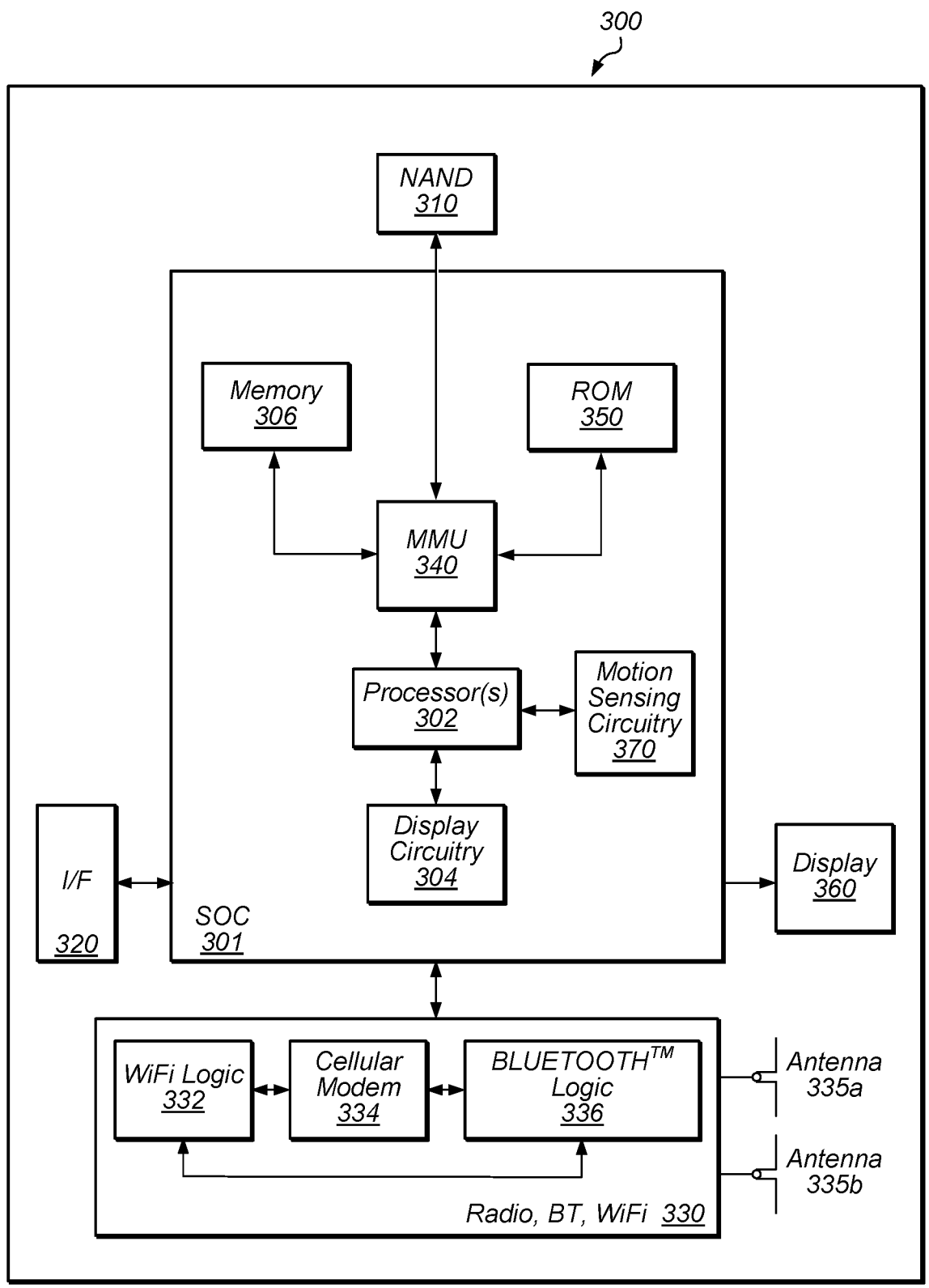

FIGS. 2-3—Exemplary Device Block Diagrams

FIG. 2 illustrates an exemplary wireless device 200 that may be configured for use in conjunction with various aspects of the present disclosure. The device 200 may be any of a variety of types of device and may be configured to perform any of a variety of types of functionality. The device 200 may be a substantially portable device or may be a substantially stationary device, potentially including any of a variety of types of device. The device 200 may be configured to perform one or more secure ranging wireless communication techniques or features, such as any of the techniques or features illustrated and/or described subsequently herein with respect to any or all of FIGS. 4-14.

As shown, the device 200 may include a processing element 202. The processing element may include or be coupled to one or more memory elements. For example, the device 200 may include one or more memory media (e.g., memory 206), which may include any of a variety of types of memory and may serve any of a variety of functions. For example, memory 206 could be RAM serving as a system memory for processing element 202. Other types and functions are also possible.

Additionally, the device 200 may include wireless communication circuitry 230. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 230 may include its own processing element (e.g., a baseband processor), e.g., in addition to the processing element 202. For example, the processing element 202 might be an 'application processor' whose primary function may be to support application layer operations in the device 200, while the wireless communication circuitry 230 might be a 'baseband processor' whose primary function may be to support baseband layer operations (e.g., to facilitate wireless communication between the device 200 and other devices) in the device 200. In other words, in some cases the device 200 may include multiple processing elements (e.g., may be a multi-processor device). Other configurations (e.g., instead of or in addition to an application processor/baseband processor configuration) utilizing a multi-processor architecture are also possible.

The device 200 may additionally include any of a variety of other components (not shown) for implementing device functionality, depending on the intended functionality of the device 200, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 200, such as processing element 202, memory 206, and wireless communication circuitry 230, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 202, peripheral interfaces for communication with peripheral components within or external to device 200, etc.) may also be provided as part of device 200.

FIG. 3 illustrates one possible block diagram of a wireless device 300, which may be one possible exemplary implementation of the device 200 illustrated in FIG. 2. As shown, the wireless device 300 may include a system on chip (SOC) 301, which may include portions for various purposes. For example, as shown, the SOC 301 may include processor(s) 302 which may execute program instructions for the wireless device 300, and display circuitry 304 which may perform graphics processing and provide display signals to the display 360. The SOC 301 may also include motion sensing circuitry 370 which may detect motion of the wireless device 300, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 301 may be coupled to various other circuits of the wireless device 300. For example, the wireless device 300 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, NFC, GPS, etc.).

The wireless device 300 may include at least one antenna, and in some embodiments multiple antennas 335a and 335b, for performing wireless communication with base stations and/or other devices. For example, the wireless device 300 may use antennas 335a and 335b to perform the wireless communication. As noted above, the wireless device 300 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the wireless device 300 to perform Wi-Fi communications, e.g., on an 802.11 network or for secure ranging communications. The Bluetooth Logic 336 is for enabling the wireless device 300 to perform Bluetooth communications. The cellular modem 334 may be capable of performing cellular communication according to one or more cellular communication technologies.

As described herein, wireless device 300 may include hardware and software components for implementing embodiments of this disclosure. For example, one or more components of the wireless communication circuitry 330 (e.g., Wi-Fi Logic 332) of the wireless device 300 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

FIG. 4—Flowchart

Figure 4:
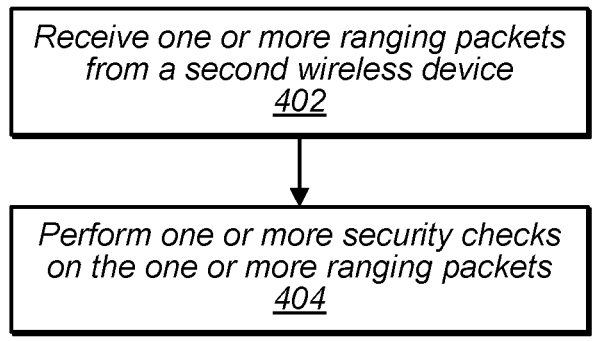
FIG. 4 is a flowchart diagram illustrating an exemplary method for performing secure ranging wireless communication, according to some embodiments.

FIG. 4 is a flowchart diagram illustrating a method for performing secure ranging wireless communication, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 4 may be implemented by a wireless device, such as the wireless devices 102, 104, 200, or 300 illustrated in and described with respect to FIGS. 1-3, or more generally in conjunction with any of the computer systems or devices shown in the above Figures, among other devices, as desired. Note that while at least some elements of the method of FIG. 4 are described in a manner relating to the use of communication techniques and/or features associated with WLAN, such description is not intended to be limiting to the disclosure, and aspects of the method of FIG. 4 may be used in any suitable wireless communication system, as desired. As shown, the method may operate as follows.

In 402, a first wireless device may receive one or more ranging packets from a second wireless device. The ranging packet(s) may include a first random sequence portion and a second random sequence portion. The random sequence portions may be based on nonces associated with the first wireless device and the second wireless device. For example, the first wireless device and the second wireless device may exchange nonces (e.g., the first wireless device may indicate a nonce associated with the first wireless device to the second wireless device, and the second wireless device may indicate a nonce associated with the second wireless device to the first wireless device) early (e.g., in one of the first few packets exchanged) in a ranging frame exchange between the first wireless device and the second wireless device. The nonces may be exchanged at a higher (e.g., above PHY) protocol stack layer with encryption, e.g., for improved security, at least according to some embodiments. Thus, the first random sequence portion and the second random sequence portion received by the first wireless device in a ranging packet from the second wireless device may be generated by the second wireless device based on its own nonce, while first and second random sequence portions transmitted by the first wireless device in a ranging packet to the second wireless device may be generated by the first wireless device based on its own nonce, at least in some instances.

The wireless device may perform channel and noise estimation for the ranging packet(s). The channel and noise estimation may be performed using either or both of the first and second random sequence portions, or other fields of the packet, according to various embodiments.

At least in some instances, the wireless device may also perform first arrival path (FAP) estimation for the ranging packet(s). For example, in some instances, the first wireless device may determine a FAP associated with the first random sequence portion of a ranging packet received from the second wireless device. Since one possible tampering scenario could include situation in which the FAP originates from an unauthorized third party utilizing hardware-based attack to transmit a waveform with a timing advance in an attempt to alter the channel estimation at the first wireless device, determining the FAP may be used by the first wireless device as part of one or more possible security checks, such as at least some of those subsequently described herein.

In 404, the first wireless device may perform one or more security checks on the one or more ranging packets. The one or more security checks may include any of a variety of possible security checks, potentially including any of those described subsequently herein with respect to FIGS. 5-14. The one or more security checks may be based on any or all of the first random sequence portion, the second random sequence portion, channel and noise estimation(s), and/or first arrival path estimation(s) for the ranging packet(s), among various possible considerations.

One possible type of security check may include a consistency check between multiple ways of performing channel estimation by the first wireless device. For example, the first wireless device may be able to perform a channel estimation for a ranging packet received from the second wireless device based on the first random sequence portion, and another channel estimation for the same ranging packet based on the second random sequence portion. Since the channel should be the same if there is no attacker tampering with the ranging packet, if the result of the consistency check is that the channel matches sufficiently according to both channel estimations, the ranging packet may pass this security check. However, if a hardware-based attacker is transmitting a waveform with a timing advance in an attempt to alter the channel estimation at the first wireless device, this may affect the channel estimations differently, and thus may cause the channel to not sufficiently match according to the consistency check, and the ranging packet may be pass this security check.

As another example of such a consistency check between multiple ways of performing channel estimation by the first wireless device, the first wireless device may be able to perform one channel estimation for one ranging packet received from the second wireless device, and another channel estimation for a different ranging packet received from the second wireless device. At least in some instances, the channel between the first wireless device and the second wireless device may be expected to be sufficiently similar at the times the different ranging packets are received that a consistency check between the channel estimations as performed on the different ranging packets may provide a useful indication of whether there may be tampering with the ranging frame exchange.

Another possible type of security check may include calculating a cost function for the ranging packet, e.g., based at least in part on the first random sequence portion and the second random sequence portion of the ranging packet. For example the cost function may be a likelihood function of receiving the second random sequence portion using the channel and noise variance as estimated based on the first random sequence portion, according to some embodiments. A confidence check may be performed for the ranging packet based on the cost function calculation, e.g., including comparing the cost function calculation with a confidence threshold. For example, according to some embodiments, it may be determined that the confidence level test is successful (e.g., the ranging packet passes the security check) if the calculated value of the cost function does not exceed a predetermined threshold. If the calculated value of the cost function does exceed the predetermined threshold, this may be an indication of an insecure ranging packet (e.g., due to hardware-based attack) or may be a result of a high noise level and/or interference level. At least in some embodiments, the threshold may be selected based on a desired target tradeoff between acceptance of a potentially insecure ranging packet and unnecessary rejection of a potentially secure ranging packet that is simply subject to high levels of noise/interference.

A still further possible type of security check may include performing a hypothesis test, e.g., between a cost function calculation that uses a channel estimation with the contribution from the FAP included and a cost function calculation that uses a channel estimation with the contribution from the FAP excluded. In many instances, if the FAP for the ranging packet is a "real" FAP (e.g., a FAP originated from the second wireless device), the channel estimation including the contribution from the FAP may provide better performance than the channel estimation excluding the contribution from the FAP. However, if the FAP for the ranging packet is a "fake" FAP (e.g., a FAP originated from an unauthorized third party), the channel estimation including the contribution from the FAP may provide worse performance than the channel estimation excluding the contribution from the FAP, e.g., since the FAP may not be representative of the actual channel between the first wireless device and the second wireless device in this case. Thus, since one aspect of possible attempt to tamper with a ranging frame exchange may include a wireless device receiving a ranging packet with a "fake" FAP, such a hypothesis test may be used in determining whether a ranging packet is secure or insecure, at least according to some embodiments.

In some instances, a check on the channel reciprocity between the first wireless device and the second wireless device may additionally or alternatively be performed as a security check for the ranging frame exchange between the first wireless device and the second wireless device. For example, at least in some instances, the transmit and receive propagation channels between the first wireless device and the second wireless device may be identical. If the same array is used for transmitting and receiving at the first wireless device and the second wireless device, and the RF front-ends are calibrated similarly, the overall channel may also be identical, such that the channel estimates obtained at the first wireless device and the second wireless device should match if there is no attempted tampering occurring. Thus, as one possibility, the second wireless device may provide channel estimation information that the second wireless device has generated based on receiving a ranging packet from the first wireless device. The first wireless device may compare the channel estimation received from the second wireless device with channel estimation information that the first wireless device has generated based on a ranging packet received from the second wireless device, e.g., using an unstructured tap comparison or a structured tap comparison. The result of the channel estimation comparison may be used in determining whether a ranging packet (and/or an entire ranging packet exchange) is secure or insecure, at least according to some embodiments. For example, if the channel estimations match sufficiently, the ranging packet(s) may be considered secure, while if the channel estimations do not match sufficiently, the ranging packet(s) may be considered insecure.

FIGS. 5-14 and Additional Information

FIGS. 5-14 and the following additional information are provided as being illustrative of further considerations and possible implementation details relating to the method of FIG. 4, and are not intended to be limiting to the disclosure as a whole. Numerous variations and alternatives to the details provided herein below are possible and should be considered within the scope of the disclosure.

Secure ranging may be used as a key technology and may be used for many possible use cases, e.g., unlocking a device (e.g., car, laptop, etc.), as an entry ticket (e.g., for a sporting event, concert, etc.), for proximity detection (e.g., for advertisement, friend finding, etc.), and/or building/room access, among various possibilities.

To achieve security, the frame exchange used for ranging/timing measurements/reports may generally need to be protected from adversarial attack and eavesdropping. If not protected or the security level is not high enough, the ranging may be hacked by an adversary.

As one possibility, an adversary may potentially tamper the ranging/timing measurements/reports, e.g., such that the location of the STA (responder) can be spoofed, which can be quite harmful to the use cases requiring security.

A secure ranging mechanism may need to be able to protect against different types of attackers. A few examples may potentially include eavesdropping, impersonation at software level, or hardware-based attack. The design of a secure ranging communication system may need to address different levels of security depending on the objective aimed for, e.g., at software/protocol level or at hardware level. The techniques disclosed herein may be capable of providing a secure ranging design that can protect against adversarial attack/impersonation at all levels (e.g., including eavesdropping, adversarial interference, impersonation at software level, and hardware-based attack).

Figure 5:
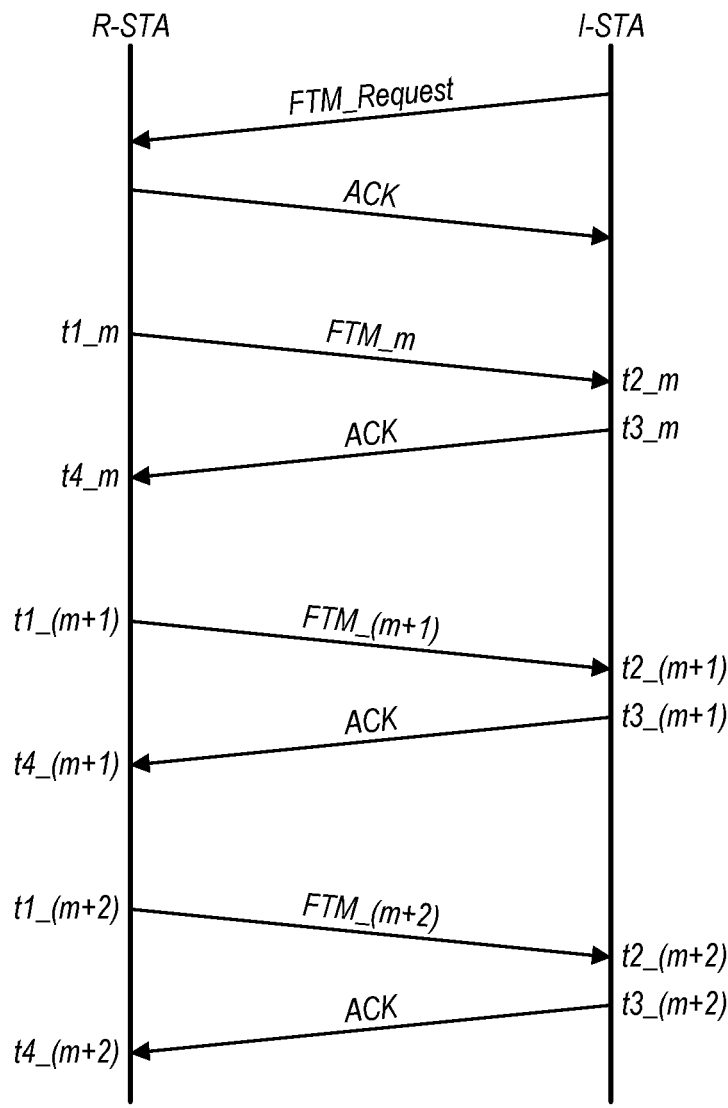
FIG. 5 is a communication flow diagram illustrating a possible ranging sequence for ranging communication, according to some embodiments.

As an example, FIG. 5 is a communication flow diagram illustrating a typical ranging sequence for a possible non-secure ranging communication. The illustrated example may be used, for example, in at least some IEEE 802.11REVmc implementations. As shown, a sequence of exchanges may occur between an initiating station (I-STA) and a responding station (R-STA). The exchanges may include a management frame initiating a fine timing measurement (FTM) request, and several FTM ranging/timing measurement frames. For each TM ranging/timing measurement frame exchange, the round trip time (RTT) can be calculated as:

$$RTT=(t4-t1)-(t3-t2)$$

As noted, this exchange lacks any security protection for the ranging measurements and reports, and thus the ranging/timing measurements could potentially be tampered with. For example, an adversary could send a fake ACK frame earlier than the I-STA. In this case, the t4 measurement may be smaller (earlier) than the true value, potentially leading to incorrect location estimations. Such an attack could be made using a hardware-based attack, at least in some instances.

Figure 6:
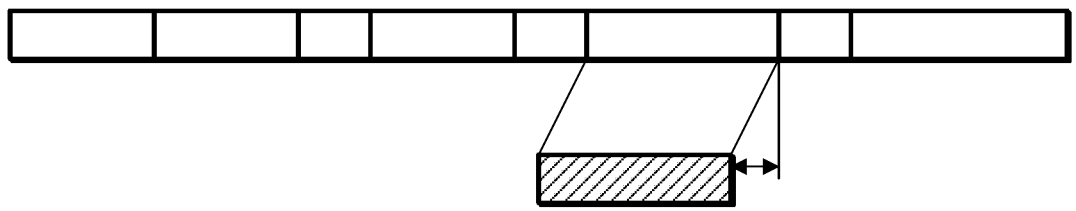
FIG. 6 illustrates a possible hardware-based attack based tampering technique for ranging communication, according to some embodiments.

As another possibility, a FTM measurement frame itself could be tampered with, e.g., by an adversary using hardware-based attack. In such a case, since the timing measurement is based on the channel impulse response that is derived from the very high throughput-long training field (VHT-LTF), the adversary may be able to listen to the initial portions of the FTM measurement frame, then generate and transmit a VHT-LTF waveform with a timing advance relative to the actual VHT-LTF field portion of the FTM measurement frame, such as illustrated in FIG. 6. In this case, the t2 and/or t4 timing measurement may be smaller (earlier) than the true value, also potentially leading to incorrect location estimations.

Existing security mechanisms for ranging communication may generally be designed from the protocol perspective. For example, a frame exchange (ACK and other frames) can be protected to some extent by adding nonces in some field(s) of the frame. However, such techniques may not be sufficient to protect against attackers that perform an attack at the hardware level, for example altering the channel estimation by transmitting a waveform over the air.

Generally, hardware-based attack may require the attacker to be able to respond to any OTA events and transmit a waveform in the micro second level. Proposed herein are potential techniques and mechanisms that may increase the security level of ranging communications to generally provide highly-secure ranging wireless communication characteristics, e.g., including protecting against hardware-based attack.

Figure 7:
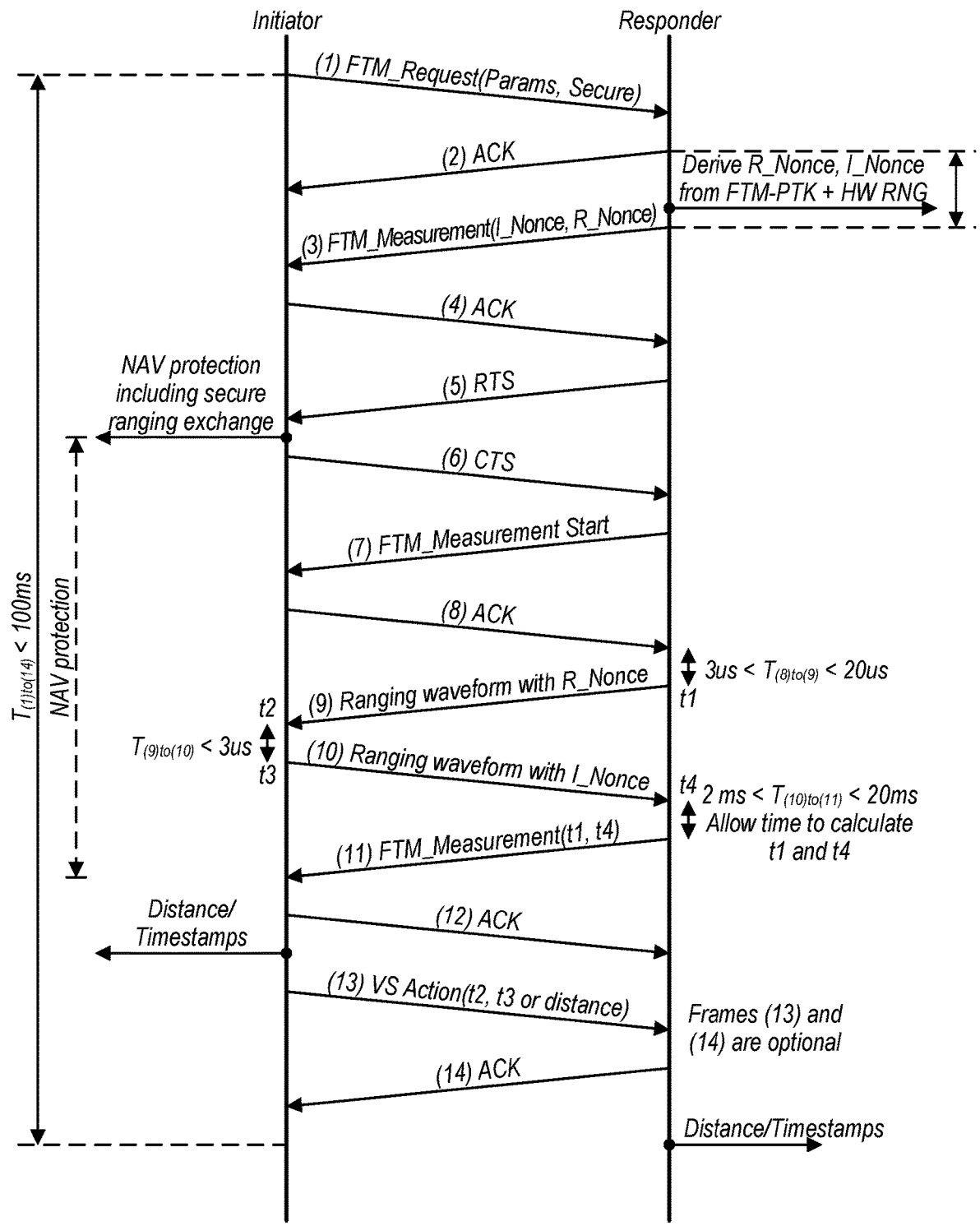
FIG. 7 is a communication flow diagram illustrating an example IEEE 802.11 compliant ranging communication scheme, according to some embodiments.

In the following examples, a ranging solution that utilizes an IEEE 802.11 compliant ranging communication scheme is used as an example. FIG. 7 is a communication flow diagram illustrating such an example ranging sequence that may occur in such a system specifically using IEEE 802.11ad compliant technology. However, note that the secure ranging features described herein may also or alternatively be used in conjunction with any number of other wireless communication systems, e.g., including sub 60 GHz WLAN based ranging (e.g., 802.11REVmc FTM) and/or non-WLAN based ranging communication systems.

Figure 8:
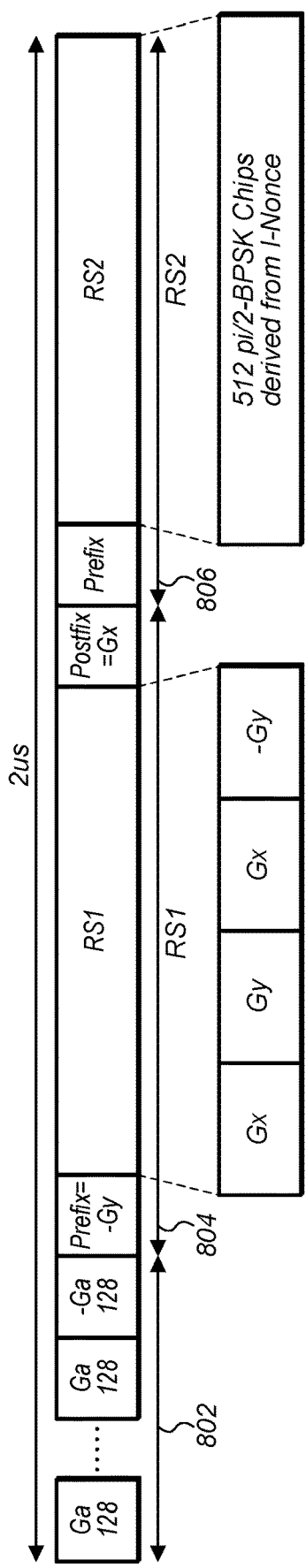
FIGS. 8-9 illustrate aspects of possible frame structures for ranging frames that may be used in ranging communication schemes, according to some embodiments.

FIG. 8 illustrates one possible frame structure for a ranging frame that may be communicated according to the techniques herein. As shown, the proposed frame may be 2 us long and may include an IEEE standard single carrier short training field (SC-STF) 802, a random sequence 1 (RS1) field 804, and a random sequence 2 (RS2) field 806. The RS1 field 804 may include a randomly selected Golay Complementary Pair (GCP) or any other random sequences derived from an I-Nonce and a R-Nonce for frames originating from I-STA and R-STA, respectively. The RS1 field 804 may be used for channel estimation and First Arrival Path (FAP) estimation. A prefix and a postfix may be added before and after RS1, respectively. The RS2 field 806 may include a random sequence derived from the I-Nonce and R-Nonce for frames originated from I-STA and R-STA, respectively. The RS2 field 806 may provide challenges for the purpose of security. A prefix may be added before RS2, according to some embodiments. Note that the I-Nonce and R-Nonce may be known by the I-STA and R-STA only (e.g., by way of a management frame towards the beginning of a ranging sequence, such as illustrated in FIG. 7, which may utilize higher layer security features to protect the I-Nonce and R-Nonce).

Figure 9:
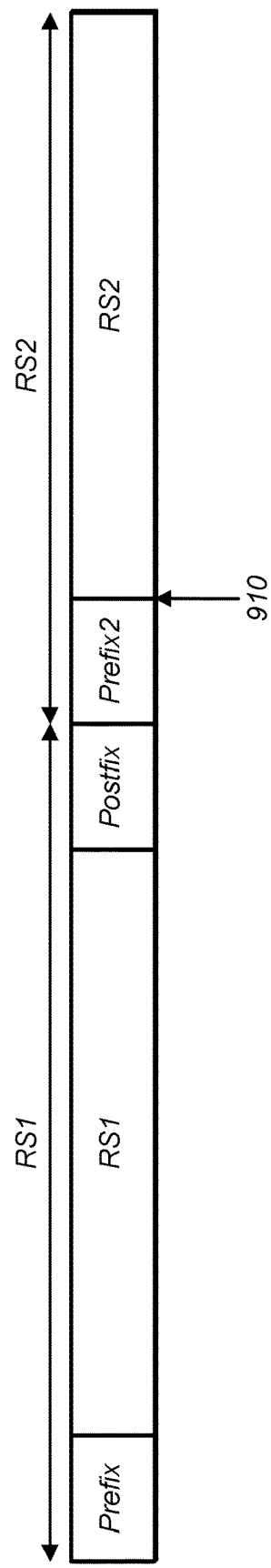

As one possible security check based on the RS2 field 806, a wireless device may attempt to perform slicing on RS2, e.g., at the portion indicated by the arrow 910 in FIG. 9. In such a security check, the prefix2 of RS2 may serve as a cyclic prefix (CP) of RS2. Frequency domain equalization (FDE) may be performed, e.g.:

$$RS_{2,freq}(k) = \frac{Y_{RS2}(k)}{H(k)}, \text{ and}$$

$$RS_2(k) = IFFT(RS_{2,freq}(k))$$

and the channel may be estimated from the RS1 sequence. The detected RS2 may be compared with the known RS2 sequence for security. For example, if the detected RS2 and the known RS2 differ too much, this may be an indication of possible tampering, while if the detected RS2 and the known RS2 are sufficiently similar, this may be an indication that the ranging sequence may be secure. However, at least according to some embodiments, this approach may not be capable of detecting a faked path with sufficient consistency, as if the faked path is of relatively small power, then it may not be detectable by slicing on RS2.

Figure 10:
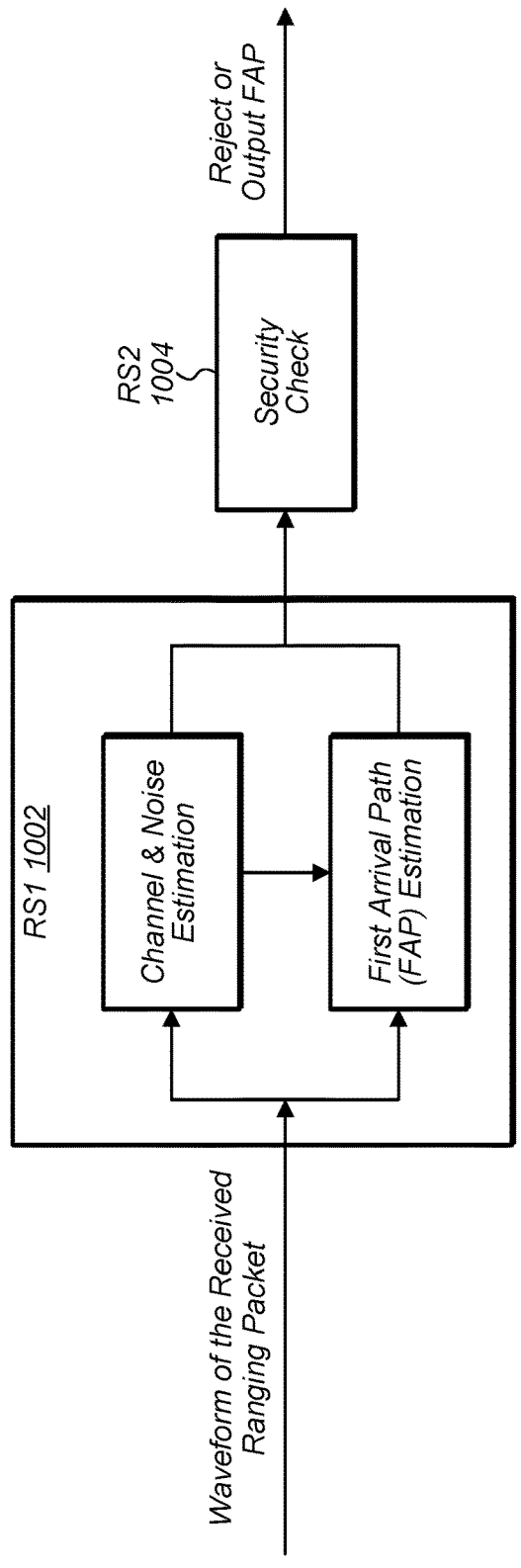
FIG. 10 illustrates possible portions of a receiver configured to perform security procedures for timing measurements in a ranging communication scheme, according to some embodiments.
Figure 11:
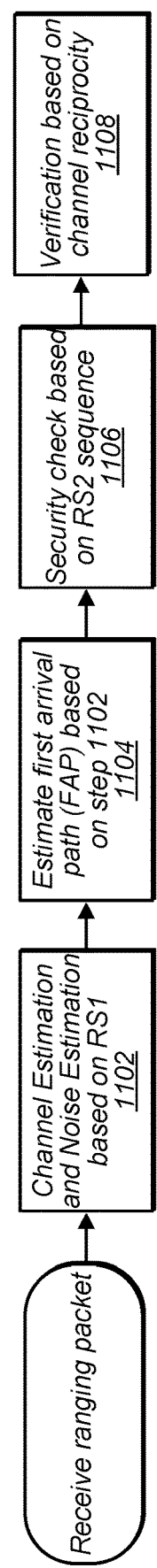
FIG. 11 is a flowchart diagram illustrating one possible method for performing security procedures for timing measurements that a receiver configured in the manner illustrated in FIG. 10 might implement, according to some embodiments.
Figure 12:
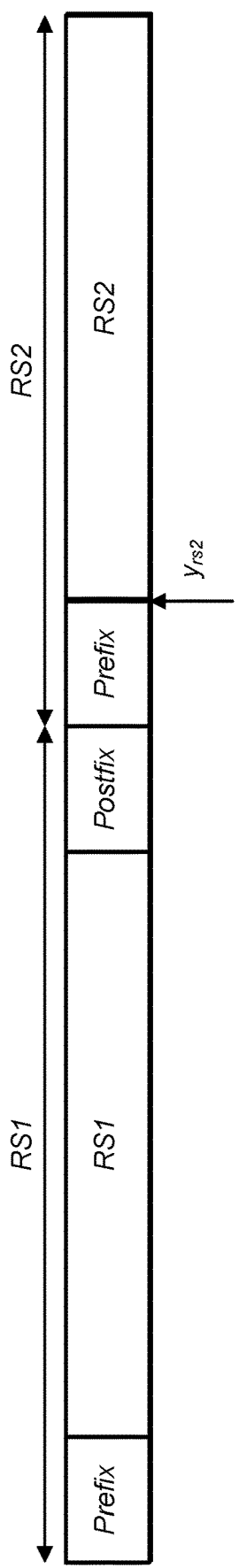
FIGS. 12-13 further illustrate aspects of possible frame structures for ranging frames that may be used in ranging communication schemes, according to some embodiments.

FIG. 10 illustrates possible portions of a receiver configured to perform an alternative approach to performing security procedures for timing measurements, according to some embodiments. FIG. 11 is a flowchart diagram illustrating one possible method for performing security procedures for timing measurements that a receiver configured in the manner illustrated in FIG. 10 might implement, according to some embodiments. A receiver may detect a ranging packet, e.g., based on the SC-STF field of the ranging packet. The waveform of the received ranging packet may be provided to an RS1 block/module 1002 of the receiver, which may perform channel and noise estimation (1102), and may estimate the first arrival path (FAP) (1104), e.g., based on the channel and noise estimation. An RS2 block 1004 may then perform one or more security checks based at least in part on the RS2 sequence (1106). These security checks may include any or all of the following.

A consistency check may be performed using channel estimates derived from RS1 and RS2, as one possibility.

A consistency check may be performed using channel estimates derived from different RS (e.g., if multiple RS are transmitted), as one possibility.

A consistency check may be performed using channel estimates derived from RS1 from multiple FTM bursts, as one possibility.

A confidence level check may be performed based on a cost function (e.g., a likelihood function), as one possibility.

A hypothesis test may be performed based on a cost function (e.g., a likelihood function), as one possibility.

Based on these checks, the FAP for the ranging packet may be rejected as potentially being impersonated, or may be output as being genuine and secure.

Additionally, if desired (and potentially if the RS2 based security check(s) pass), a verification check based on channel reciprocity between the I-STA and the R-STA may be performed (1108).

Such techniques may help detect an unreliable FAP. There may be two common reasons for an unreliable FAP, including the channel estimation being corrupted by noise (which may be unavoidable), and/or the channel estimation being altered due to interference/hardware-based attack from an adversarial attacker.

Using cost function-/consistency of channel estimation information as a basis for performing one or more security checks on RS2, such as described both previously and subsequently herein, may help detect faked paths created by adversarial attackers, including by checking the confidence level of the FAP estimation to rule out unreliable/erroneous FAP estimations. Thus, such security checks may help protect against adversarial attack with software impersonation and/or hardware-based attack and help achieve highly-secure ranging wireless communication.

As previously noted, one possible security check may include performing a consistency check on channel estimates derived from different ranging packet portions. Such a consistency check may be useful at least in part due to the short nature of the ranging frame/FTM bursts: channels should be consistent within a burst as well as generally between bursts. The different sources could include RS1 sequences from multiple FTM bursts/ranging frames, and/or could include an RS1 and RS2 sequence from the same FTM burst/ranging frame. This technique may take advantage of the very high likelihood that an adversarial attacker cannot create interference or impersonate in such a manner that the channels from RS1 and RS2 are consistent, e.g., since both RS1 and RS2 are unknown by itself.

In order to perform such a consistency check, a function may be defined to measure the consistency:

$$f_{consistency}(\hat{h}_1, \hat{h}_2)$$

where $\hat{h}_1$ denotes a channel estimate from a first source and $\hat{h}_2$ denotes a channel estimate from a second source.

The consistency function can take any of a variety of forms. One example may include a distance based (e.g., vector norm, p-norm) function, such as the following function:

$$f_{consistency}(\hat{h}_1, \hat{h}_2) = |\hat{h}_1 - \hat{h}_2| = \left(\sum_n |\hat{h}_1(n) - \hat{h}_2(n)|^p\right)^{\frac{1}{p}}$$

Another possible example may include a ratio based function, such as the following function:

$$f_{consistency}(\hat{h}_1, \hat{h}_2) = \max_n \left|\frac{\hat{h}_1(n)}{\hat{h}_2(n)}\right|$$

Still another possible example may include a FAP path based function, such as the following function:

$$f_{consistency}(\hat{h}_1, \hat{h}_2) = \begin{cases} 1, & \text{if the paths declared for } FAP \text{ are identical} \\ 0, & \text{otherwise} \end{cases}$$

Note that any number of other functions could also or alternatively be used, as desired.

The value of the consistency function may be compared with a threshold. The channel estimates should not vary more than an amount that is expected for interference free noise levels at the receiver. If the consistency check meets the expectation, the consistency test on channel estimation is considered to be successful. As previously noted, the consistency check can be carried out between the RS1 sequence and the RS2 sequence in a given ranging frame, and/or between the RS1 sequences in multiple FTM bursts/ranging frames.

An additional possible security check based on RS2 may include calculating a cost function based on RS2. The cost function may generally be an indicator of the reliability on receiving RS2. As one example, the cost function may be defined as being the likelihood function of receiving $y_{RS2}$ in accordance with the frame structure illustrated in FIG. 12:

$$CostFun_1(y_{RS2}, \hat{h}, \hat{\sigma}^2) \triangleq \frac{1}{\pi\sigma^2} \exp\left(-\frac{\sum_{n=128}^{639} |y_{RS2}(n) - \hat{h}(n) * s(n)|^2}{\sigma^2}\right)$$

where:
$y_{RS2}$: The received chips corresponding to RS2
$\hat{h}$: The estimated channel based on RS1
$\hat{\sigma}^2$: The estimated noise variance based on RS1

$s(n)$ is defined as: $s(n) = \begin{cases} RS2(384+n), & \text{for } 0 \leq n \leq 127 \\ RS2(n-128), & \text{for } 128 \leq n \leq 639 \end{cases}$ Note that since the $CostFun_1$ is monotonic with the summation term, it can also be defined as log-likelihood function (with the minus sign removed), i.e.:

$$CostFun_2(y_{RS2}, \hat{h}, \hat{\sigma}^2) \triangleq \frac{\sum_{n=128}^{639} |y_{RS2}(n) - \hat{h}(n) * s(n)|^2}{\hat{\sigma}^2}$$

Figure 13:
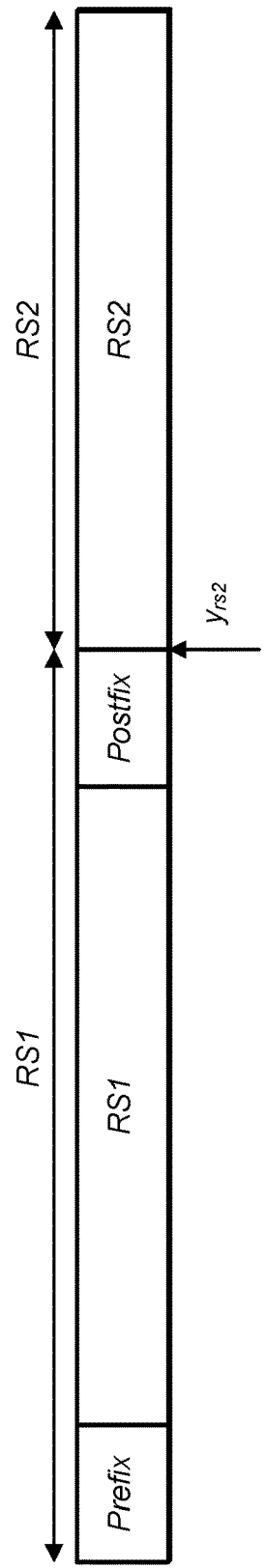
Figure 14A:
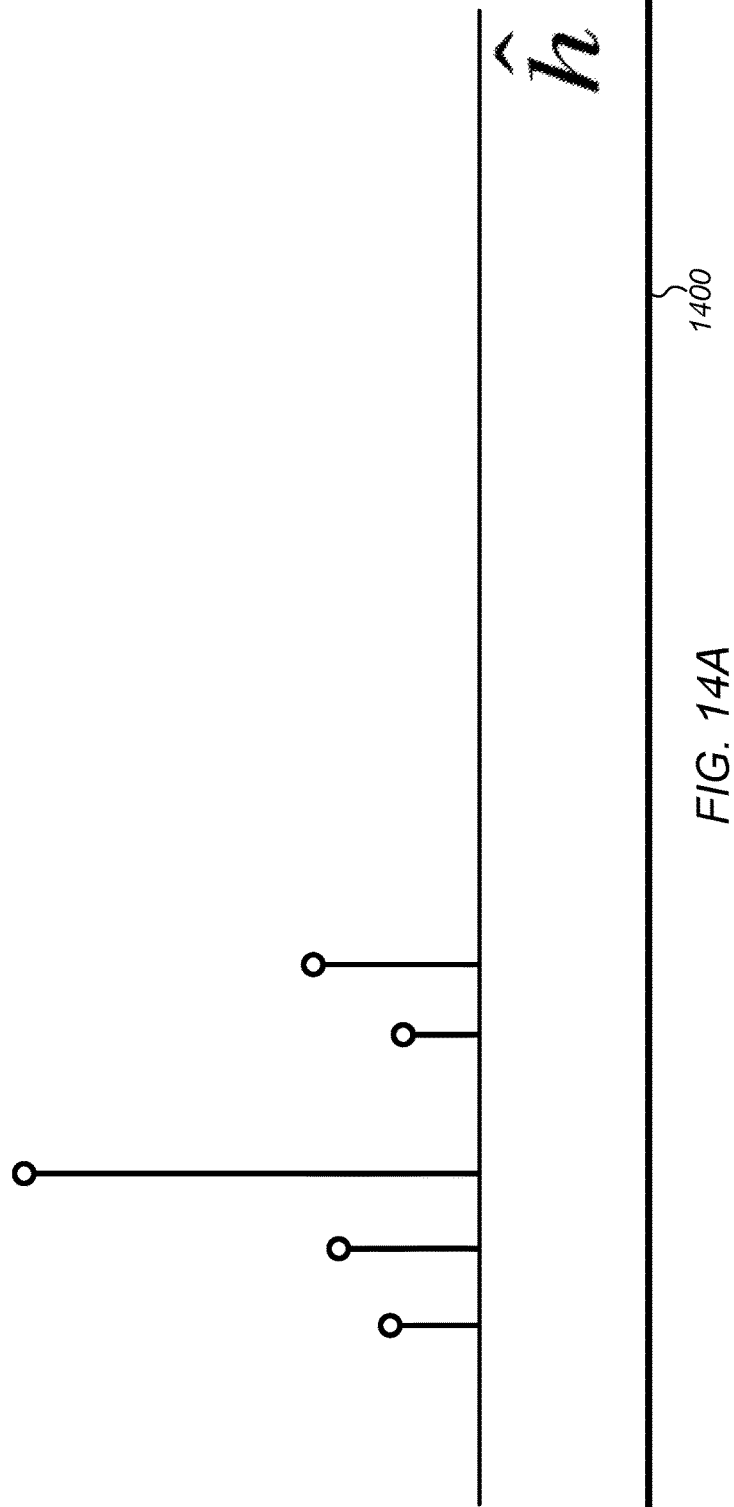
FIGS. 14A-14B illustrate examples of possible channel estimates including and excluding a contribution from a first arrival path respectively, such as might be used as part of a hypothesis test on the first arrival path, according to some embodiments.
Figure 14B:
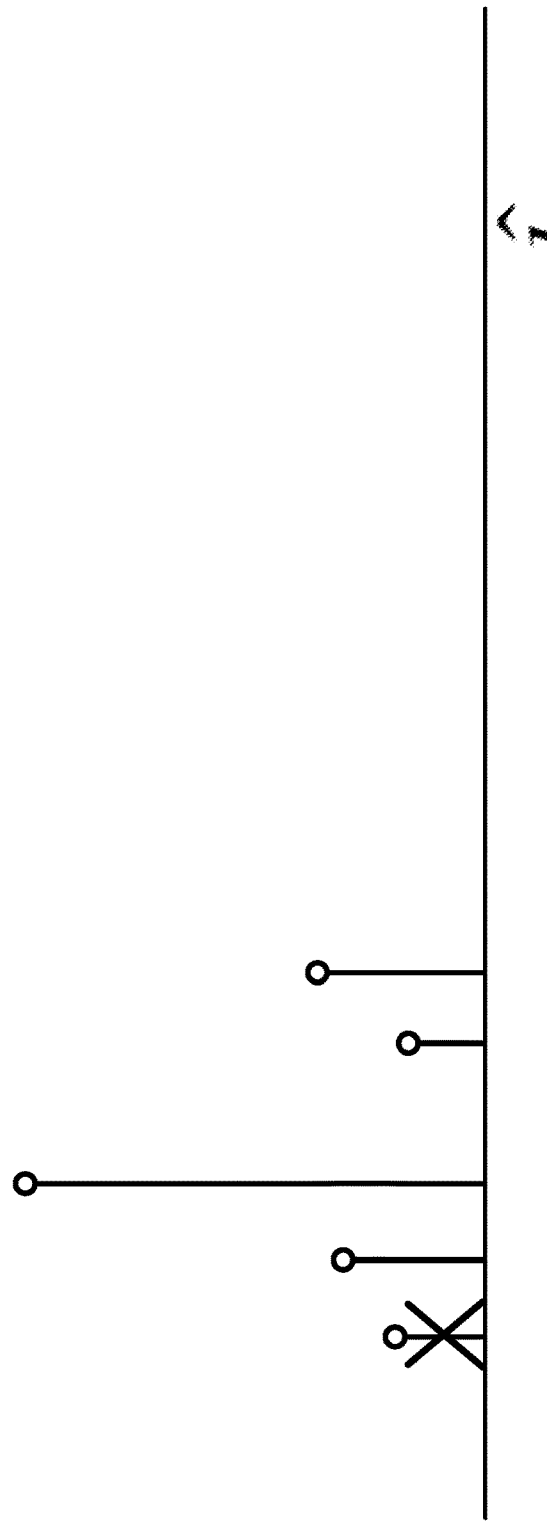

Alternatively, an RS2 with no cyclic prefix, such according to the frame structure illustrated in FIG. 13, may be used if desired. This may eliminate the redundancy of RS2, which may reduce potential security vulnerability due to repetition of security related information. In this case, all samples of the alternative RS2 are random and there is no structure on RS2. In this case the cost function may include samples of the RS1 postfix as well as the RS2 sequence. Convolution required for the cost function calculation may be implemented using frequency domain techniques, as one possibility.

Once the cost function has been calculated, the result may be compared with a threshold to determine if the confidence test is successful. For example, the confidence test may be considered successful for CostFun$_2$ if the following condition is met:

$$\text{CostFun}_2(y_{RS2},\hat{h},\hat{\sigma}^2) \leq \text{Threshold}_2$$

This test may rule out the acceptance of an incorrect channel estimate (false trigger) that may occur due to high noise level or interference level, or due to hardware-based attack. The threshold can be chosen based on the target tradeoff between false acceptance and unnecessary rejection of the channel estimate. Note that, at least in some instances, it may be desirable to choose a conservative threshold. For example, for secure ranging applications, the penalty for false acceptance may be more severe (e.g., a potential security violation) than the penalty for unnecessary rejection.

A further possible security check may include a hypothesis test on the first arrival path (FAP), e.g., to determine whether the declared FAP is fake or genuine. The test may compare the likelihood of receiving $y_{RS2}$ assuming two different versions of channel estimates. One version may include the channel estimates derived from RS1 directly, which may be denoted as $\hat{h}$ and which may be represented in the illustration 1400 of FIG. 14A. The other version may include a channel estimate obtained by deleting the contribution from the declared FAP from $\hat{h}$, which may be denoted as $\hat{h}_{null\text{-}FAP}$ and which may be represented in the illustration 1450 of FIG. 14B.

Any of multiple possible test methods may be used for the hypothesis test on the FAP, as desired. As one possibility, the difference between the two cost functions may be compared with a threshold. If the difference is less than or equal to (e.g., more negative than) the selected threshold, a fake path may be detected. For example, if the following condition is met, a fake path may be detected:

$$(\text{CostFun}_{2,null\text{-}FAP}(y_{RS2},\hat{h},\hat{\sigma}^2) - \text{CostFun}_2(y_{RS2},\hat{h},\hat{\sigma}^2))$$
$$< \text{Threshold}_{1,null\text{-}FAP}$$

As another possibility, the ratio between the two cost functions may be compared with a threshold. If the difference is smaller than or equal to the selected threshold, a fake path may be detected. For example, if the following condition is met, a fake path may be detected:

$$\frac{\text{CostFun}_{2,null\text{-}FAP}(y_{RS2},\hat{h},\hat{\sigma}^2)}{\text{CostFun}_2(y_{RS2},\hat{h},\hat{\sigma}^2)} < \text{Threshold}_{2,null\text{-}FAP}$$

Note that at least in some instances, the latter method may (e.g., potentially advantageously) not require noise power information in order to compute the ratio.

A further step, e.g., in addition to performing any desired security checks based on RS2, may include verifying the reciprocity of the channels for the I-STA and the R-STA. Due to the TDD nature of the transmissions, the Tx/Rx propagation channels between the I-STA and the R-STA may be reciprocal. In some instances, the overall channel (propagation and RF front end) may further be reciprocal, e.g., if the same array is used to transmit and receive at the I-STA and the R-STA, and if the RF front-ends are properly calibrated. If such requirements are met, the channel estimates obtained at the I-STA and R-STA should match and thus a comparison between them may be used to further increase the security of the ranging protocol. For example, the channel between the two entities may be unique and maybe observable only by the I-STA and the R-STA. The I-STA and the R-STA may share these channel estimates through the secured FTM link, e.g., with encryption, for the comparison. Note that this step may not be reached if a failure occurs in a prior security check step (e.g., when performing any security checks based on RS2).

Multiple possible techniques may be used for the verification of the channel reciprocity. In some instances, the verification may include a channel impulse response comparison. For example, in an unstructured channel tap comparison, the I-STA may send (for example) chip-spaced samples of estimated channel impulse response to the R-STA over the FTM secure link. The number of impulse response taps can be configured based on the environment. The comparison performed by the R-STA can utilize a consistency metric such as previously described herein. As another example, in a structured channel tap comparison, the I-STA may estimate amplitudes and (fractional) delays of individual paths contributing to the channel impulse response. The I-STA may send the set of amplitudes and delays to the R-STA over the FTM secure link. For the comparison, the R-STA may use the relative amplitude and differential delays with respect to the first arriving path.

In the following further exemplary embodiments are provided.

One set of embodiments may include a method, comprising: by a first wireless device: receiving a ranging packet from a second wireless device in a wireless manner, wherein the ranging packet comprises at least a first random sequence portion and a second random sequence portion; performing channel and noise estimation for the ranging packet; and performing one or more security checks for the ranging packet based at least in part on the second random sequence portion and the channel and noise estimation for the ranging packet.

According to some embodiments, performing the one or more security checks for the ranging packet further comprises: performing a first channel estimation for the ranging packet based at least in part on the first random sequence portion; performing a second channel estimation for the ranging packet based at least in part on the second random sequence portion; and performing a consistency check between the first channel estimation and the second channel estimation.

According to some embodiments, performing the one or more security checks for the ranging packet further comprises: receiving an additional ranging packet from the second wireless device in a wireless manner; performing channel and noise estimation for the additional ranging packet; performing a consistency check between the channel estimation for the ranging packet and the channel estimation for the additional ranging packet.

According to some embodiments, the consistency check comprises one of: a distance based consistency check; a ratio based consistency check; or a first arrival path (FAP) based consistency check.

According to some embodiments, the first random sequence portion and the second random sequence portion are generated based at least in part on a first nonce associated with the first wireless device and a second nonce associated with the second wireless device.

According to some embodiments, performing the one or more security checks for the ranging packet further comprises: calculating a cost function for the ranging packet based at least in part on the second random sequence portion of the ranging packet; and performing a confidence check for the ranging packet based on the cost function calculation for the ranging packet, wherein the confidence check comprises comparing the cost function calculation with a confidence threshold.

According to some embodiments, the method further comprises: estimating a first arrival path (FAP) for the ranging packet based at least in part on the channel and noise estimation for the ranging packet, wherein performing the one or more security checks for the ranging packet further comprises: calculating a first cost function for the ranging packet based at least in part on a channel estimation for the ranging packet with a contribution to the channel estimation from the FAP included; calculating a second cost function for the ranging packet based at least in part on a channel estimation for the ranging packet with the contribution to the channel estimation from the FAP excluded; performing a hypothesis test for the ranging packet based on the first and second cost function calculations for the ranging packet; and determining whether the ranging packet comprises a fake first arrival path based at least in part on performing the hypothesis test.

According to some embodiments, the method further comprises: receiving channel estimation information from the second wireless device, wherein the channel estimation information received from the second wireless device is associated with a ranging packet received by the second wireless device from the first wireless device; and comparing the channel estimation information received from the second wireless device with channel estimation information associated with the ranging packet received by the first wireless device from the second wireless device to determine whether the channel estimation information received from the second wireless device is consistent with the channel estimation information associated with the ranging packet received by the first wireless device.

A further exemplary set of embodiments may include an apparatus, comprising a processing element configured to cause a device to implement any or all parts of the preceding examples.

Another exemplary set of embodiments may include a wireless device, comprising: an antenna; a radio coupled to the antenna; and a processing element operably coupled to the radio, wherein the device is configured to implement any or all parts of the preceding examples.

A yet further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a wireless device 102 or 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising a processing element configured to cause a first wireless device to:
   receive a ranging packet from a second wireless device in a wireless manner, wherein the ranging packet comprises a first random sequence portion and a second random sequence portion;
   perform one or more security checks for the ranging packet, wherein to perform the one or more security checks for the ranging packet, the processing element is further configured to cause the first wireless device to:
   perform a first calculation for the ranging packet based at least in part on the first random sequence portion;
   perform a second calculation for the ranging packet based at least in part on the second random sequence portion; and
   determine whether the ranging packet is secure based at least in part on the first calculation and the second calculation.

2. The apparatus of claim 1,
   wherein performing the first calculation for the ranging packet comprises performing a first channel estimation for the ranging packet based at least in part on the first random sequence portion;
   wherein performing the second calculation for the ranging packet comprises performing a second channel estimation for the ranging packet based at least in part on the second random sequence portion;
   wherein determining whether the ranging packet is secure based at least in part on the first calculation and the second calculation comprises:
   performing a consistency check between the first channel estimation and the second channel estimation; and
   determining whether the ranging packet is secure based at least in part on the consistency check.

3. The apparatus of claim 1,
   wherein the first random sequence portion and the second random sequence portion are generated based at least in part on a first nonce associated with the first wireless device and a second nonce associated with the second wireless device.

4. The apparatus of claim 1, wherein to perform the one or more security checks for the ranging packet, the processing element is further configured to cause the first wireless device to:
   calculate a cost function for the ranging packet based at least in part on the first random sequence portion and the second random sequence portion of the ranging packet;
   perform a confidence check for the ranging packet based on the cost function calculation for the ranging packet, wherein the confidence check comprises comparing the cost function calculation with a confidence threshold; and
   determine whether the ranging packet is secure based at least in part on comparing the cost function calculation with a confidence threshold.

5. The apparatus of claim 1,
   wherein performing the first calculation comprises performing channel estimation based at least in part on the first random sequence portion, and
   wherein performing the second calculation comprises calculating a likelihood function of receiving the second random sequence function based at least in part on the channel estimation.

6. The apparatus of claim 1,
   wherein performing the first calculation comprises:
      estimating a first arrival path (FAP) based at least in part on the first random sequence portion; and
      calculating a first cost function for receiving the second random sequence portion based at least in part on a channel estimation for the ranging packet with a contribution to the channel estimation from the FAP included,
   wherein performing the second calculation comprises calculating a second cost function for receiving the second random sequence portion based at least in part on a channel estimation for the ranging packet with the contribution to the channel estimation from the FAP excluded,
   wherein determining whether the ranging packet is secure based at least in part on the first calculation and the second calculation comprises:
      performing a hypothesis test for the ranging packet based on the first and second cost function calculations for the ranging packet; and
      determining whether the ranging packet comprises a fake first arrival path based at least in part on performing the hypothesis test.

7. The apparatus of claim 1, wherein to perform the one or more security checks for the ranging packet, the processing element is further configured to cause the first wireless device to:
   receive channel estimation information from the second wireless device, wherein the channel estimation information received from the second wireless device is associated with a ranging packet received by the second wireless device from the first wireless device;
   compare the channel estimation information received from the second wireless device with channel estimation information associated with the ranging packet received by the first wireless device from the second wireless device to determine whether the channel estimation information received from the second wireless device is consistent with the channel estimation information associated with the ranging packet received by the first wireless device; and
   determine whether the ranging packet is secure based at least in part on whether the channel estimation information received from the second wireless device is consistent with the channel estimation information associated with the ranging packet received by the first wireless device.

8. The apparatus of claim 1, wherein to perform the one or more security checks for the ranging packet, the processing element is further configured to cause the first wireless device to:
   perform channel estimation for the ranging packet;
   receive an additional ranging packet from the second wireless device in a wireless manner;
   perform channel estimation for the additional ranging packet;
   perform a consistency check between the channel estimation for the ranging packet and the channel estimation for the additional ranging packet; and
   determine whether the ranging packet is secure based at least in part on the consistency check.

9. A method for operating a first wireless device, the method comprising:
   receiving a ranging packet from a second wireless device in a wireless manner, wherein the ranging packet comprises a first random sequence portion and a second random sequence portion;
   performing one or more security checks for the ranging packet, wherein performing the one or more security checks for the ranging packet comprises:
      performing a first calculation for the ranging packet based at least in part on the first random sequence portion;
      performing a second calculation for the ranging packet based at least in part on the second random sequence portion; and
      determining whether the ranging packet is secure based at least in part on the first calculation and the second calculation.

10. The method of claim 9,
    wherein performing the first calculation for the ranging packet comprises performing a first channel estimation for the ranging packet based at least in part on the first random sequence portion;
    wherein performing the second calculation for the ranging packet comprises performing a second channel estimation for the ranging packet based at least in part on the second random sequence portion;
    wherein determining whether the ranging packet is secure based at least in part on the first calculation and the second calculation comprises:
       performing a consistency check between the first channel estimation and the second channel estimation; and
       determining whether the ranging packet is secure based at least in part on the consistency check.

11. The method of claim 9,
    wherein the first random sequence portion and the second random sequence portion are generated based at least in part on a first nonce associated with the first wireless device and a second nonce associated with the second wireless device.

12. The method of claim 9, wherein performing the one or more security checks for the ranging packet further comprises:

calculating a cost function for the ranging packet based at least in part on the first random sequence portion and the second random sequence portion of the ranging packet;
performing a confidence check for the ranging packet based on the cost function calculation for the ranging packet, wherein the confidence check comprises comparing the cost function calculation with a confidence threshold; and
determining whether the ranging packet is secure based at least in part on comparing the cost function calculation with a confidence threshold.

13. The method of claim 9,
wherein performing the first calculation comprises performing channel estimation based at least in part on the first random sequence portion, and
wherein performing the second calculation comprises calculating a likelihood function of receiving the second random sequence function based at least in part on the channel estimation.

14. The method of claim 9,
wherein performing the first calculation comprises:
estimating a first arrival path (FAP) based at least in part on the first random sequence portion; and
calculating a first cost function for receiving the second random sequence portion based at least in part on a channel estimation for the ranging packet with a contribution to the channel estimation from the FAP included,
wherein performing the second calculation comprises calculating a second cost function for receiving the second random sequence portion based at least in part on a channel estimation for the ranging packet with the contribution to the channel estimation from the FAP excluded,
wherein determining whether the ranging packet is secure based at least in part on the first calculation and the second calculation comprises:
performing a hypothesis test for the ranging packet based on the first and second cost function calculations for the ranging packet; and
determining whether the ranging packet comprises a fake first arrival path based at least in part on performing the hypothesis test.

15. The method of claim 9, wherein performing the one or more security checks for the ranging packet further comprises:
receiving channel estimation information from the second wireless device, wherein the channel estimation information received from the second wireless device is associated with a ranging packet received by the second wireless device from the first wireless device;
comparing the channel estimation information received from the second wireless device with channel estimation information associated with the ranging packet received by the first wireless device from the second wireless device to determine whether the channel estimation information received from the second wireless device is consistent with the channel estimation information associated with the ranging packet received by the first wireless device; and
determining whether the ranging packet is secure based at least in part on whether the channel estimation information received from the second wireless device is consistent with the channel estimation information associated with the ranging packet received by the first wireless device.

16. A first wireless device, comprising:
a radio comprising one or more antennas and configured for wireless communication; and
a processor operably coupled to the radio, wherein the first wireless device is configured to:
receive a ranging packet from a second wireless device in a wireless manner, wherein the ranging packet comprises a first random sequence portion and a second random sequence portion;
perform one or more security checks for the ranging packet, wherein to perform the one or more security checks for the ranging packet, the first wireless device is further configured to:
perform a first calculation for the ranging packet based at least in part on the first random sequence portion;
perform a second calculation for the ranging packet based at least in part on the second random sequence portion; and
determine whether the ranging packet is secure based at least in part on the first calculation and the second calculation.

17. The first wireless device of claim 16,
wherein performing the first calculation for the ranging packet comprises performing a first channel estimation for the ranging packet based at least in part on the first random sequence portion;
wherein performing the second calculation for the ranging packet comprises performing a second channel estimation for the ranging packet based at least in part on the second random sequence portion;
wherein determining whether the ranging packet is secure based at least in part on the first calculation and the second calculation comprises:
performing a consistency check between the first channel estimation and the second channel estimation; and
determining whether the ranging packet is secure based at least in part on the consistency check.

18. The first wireless device of claim 16, wherein to perform the one or more security checks for the ranging packet, the first wireless device is further configured to:
calculate a cost function for the ranging packet based at least in part on the first random sequence portion and the second random sequence portion of the ranging packet;
perform a confidence check for the ranging packet based on the cost function calculation for the ranging packet, wherein the confidence check comprises comparing the cost function calculation with a confidence threshold; and
determine whether the ranging packet is secure based at least in part on comparing the cost function calculation with a confidence threshold.

19. The first wireless device of claim 16,
wherein, in performing the first calculation, the first wireless device is further configured to:
estimate a first arrival path (FAP) based at least in part on the first random sequence portion; and
calculate a first cost function for receiving the second random sequence portion based at least in part on a channel estimation for the ranging packet with a contribution to the channel estimation from the FAP included,
wherein, in performing the second calculation, the first wireless device is further configured to calculate a second cost function for receiving the second random sequence portion based at least in part on a channel estimation for the ranging packet with the contribution to the channel estimation from the FAP excluded, wherein determining whether the ranging packet is secure based at least in part on the first calculation and the second calculation comprises:

performing a hypothesis test for the ranging packet based on the first and second cost function calculations for the ranging packet; and determining whether the ranging packet comprises a fake first arrival path based at least in part on performing the hypothesis test.

20. The first wireless device of claim 16, wherein to perform the one or more security checks for the ranging packet, the first wireless device is further configured to:

perform channel estimation for the ranging packet;

receive an additional ranging packet from the second wireless device in a wireless manner;

perform channel estimation for the additional ranging packet;

perform a consistency check between the channel estimation for the ranging packet and the channel estimation for the additional ranging packet; and determine whether the ranging packet is secure based at least in part on the consistency check.

\* \* \* \* \*